(No Model.)
A. MILL.
CARRYING SHEAVE.
No. 410,986. Patented Sept. 10, 1889.
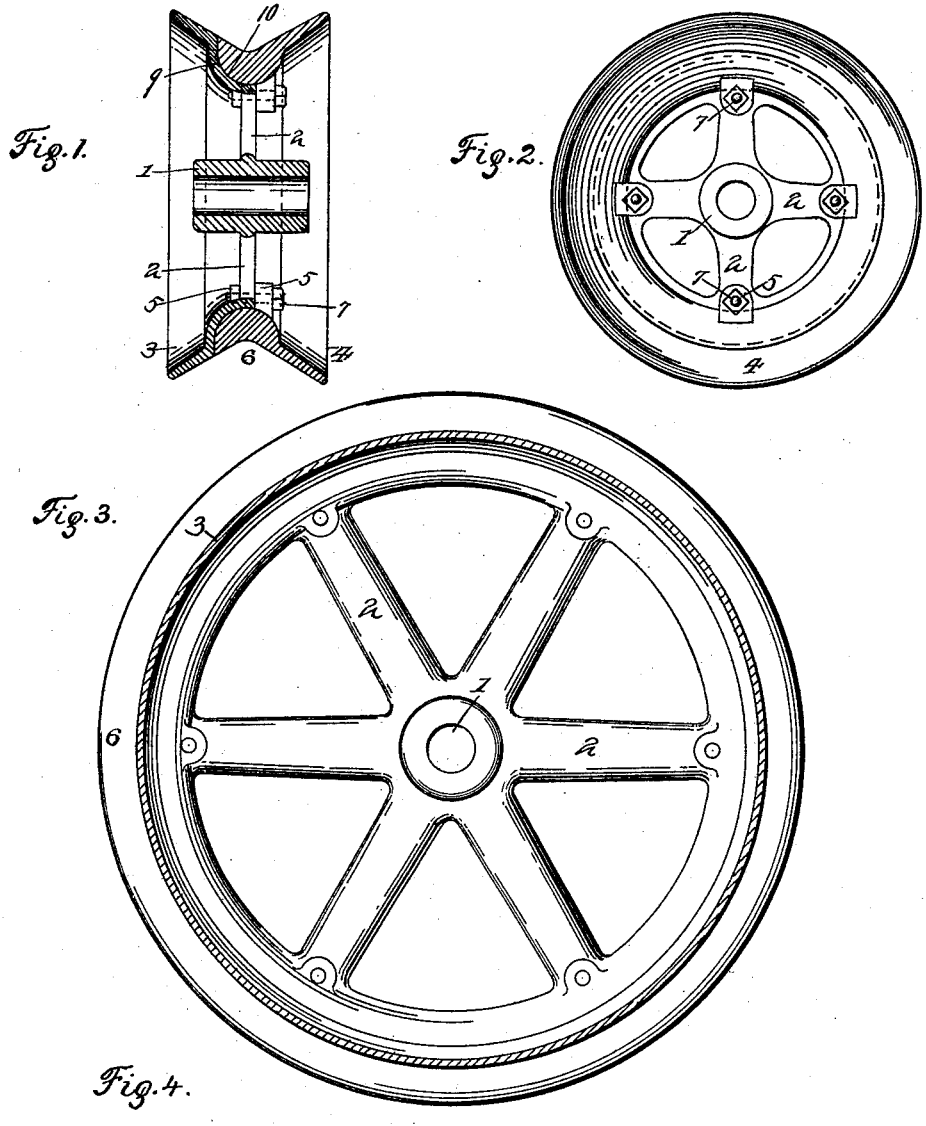
Attest.
T. Simmons
W. F. Ross
Inventor.
Anton Mill.
By Wood & Boyd
his Attorneys &c

UNITED STATES PATENT OFFICE.

ANTON MILL, OF CINCINNATI, OHIO, ASSIGNOR OF ONE-HALF TO HERMAN BROCKMAN, OF SAME PLACE.

CARRYING-SHEAVE.

SPECIFICATION forming part of Letters Patent No. 410,986, dated September 10, 1889.

Application filed December 8, 1888. Serial No. 292,998. (No model.)

*To all whom it may concern:*

Be it known that I, ANTON MILL, a citizen of the United States, and a resident of Cincinnati, in the county of Hamilton and State of Ohio, have invented certain new and useful Improvements in Carrying-Sheaves, of which the following is a specification.

The object of my invention is to provide a sectional frictional pulley so constructed that the wearing portion is all in the rim-section, which can be readily taken off and renewed without disturbing the setting of the wheel, which is much cheaper than the renewal of the pulley, the features of which are fully set forth in the description of the accompanying drawings, making a part of this specification, in which—

Figure 1 is a central vertical section of my improvement. Fig. 2 is a side elevation of the same. Fig. 3 is an elevation of a modification, and Fig. 4 is a transverse central section of the same.

In order to enable those skilled in the art to make and use my invention, I will now describe the same in detail, referring to the drawings, wherein—

The numeral 1 indicates the hub cast integral with a series of spokes 2, and a metallic rim 3, having at one side an annular concave seat 9. The rim 4, which is the part to be renewed when worn, is formed integral with the cable bearing and wearing groove 6. Entirely within it and between its side edges and interiorly this rim 4 is provided with an annular convex bearing 10, which rests in the concave seat 9 of the rim 3. The rim 4 is also formed with inwardly-projecting lugs 5, that are coincident with and detachably bolted to the spokes 2 by bolts 7. By this means of construction the wearing-surface of the rim 4 may be chilled, if desired, and still a strong pulley made.

In Figs. 3 and 4 I have shown a modification, in which the rim 3 is elongated and projects off at a less angle, so as to make what is termed a "groove-pulley." This construction allows the cable which works in the groove 6 to work off at one side. The groove 6 is abutted by an abrupt elevation 8 to prevent the cable from running off the pulley at that side. This form of pulley is used where cables make a turn or curve.

By my construction the entire or substantially the entire cable bearing and wearing groove 6 is within and between the side edges of the detachable metallic rim 4, and therefore this part, which receives nearly the whole wearing effect of the cable, can be readily renewed to provide a practically new pulley without disturbing other parts of the latter.

I do not broadly claim a pulley having a detachable rim, as such of itself is not my invention.

Having described my invention, what I claim is—

1. A sectional pulley consisting of the rim 3, having an annular concave seat in one side and formed integral with the spokes 2 and hub 1, the rim 4, having an annular convex bearing fitting the concave seat and formed with inwardly-projecting lugs 5, and bolts engaging the lugs and connecting the rims together, substantially as described.

2. A sectional pulley consisting of the rim 3, having an annular concave seat in one side and formed integral with the spokes 2 and hub 1, the detachable rim 4, having an annular convex bearing fitting the concave seat and formed with the wearing-groove 6 entirely within it, and bolts 7, uniting the rims, substantially as described.

3. A sectional pulley consisting of the rim 3, formed integral with the spokes 2 and hub 1, the rim 4, formed with the cable receiving and bearing groove 6 entirely within it, and having its inside provided with inwardly-projecting lugs 5, coincident with the spokes, and bolts 7, connecting the lugs with the spokes, substantially as described.

In testimony whereof I have hereunto set my hand.

ANTON MILL.

Witnesses:
   RUFUS S. SIMMONS,
   T. SIMMONS.